(12) United States Patent
Nakanishi

(10) Patent No.: US 6,750,844 B2
(45) Date of Patent: Jun. 15, 2004

(54) ELECTROPHORETIC DISPLAY DEVICE AND PROCESS FOR PRODUCTION THEREOF

(75) Inventor: Masahiro Nakanishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 09/879,194

(22) Filed: Jun. 13, 2001

(65) Prior Publication Data

US 2002/0018043 A1 Feb. 14, 2002

(30) Foreign Application Priority Data

Jun. 14, 2000 (JP) .................................... 2000-178689

(51) Int. Cl.⁷ ............................ G09G 3/34; G02B 26/00
(52) U.S. Cl. ................................... 345/107; 359/296
(58) Field of Search ......................... 345/107; 359/296; 313/484, 485, 505

(56) References Cited

U.S. PATENT DOCUMENTS

| | | | | |
|---|---|---|---|---|
| 3,668,106 A | | 6/1972 | Ota .......................... 204/299 |
| 3,870,517 A | * | 3/1975 | Ota et al. ..................... 430/38 |
| 5,739,946 A | * | 4/1998 | Iwanaga et al. ............. 359/296 |
| 5,914,805 A | * | 6/1999 | Crowley ..................... 359/296 |
| 6,072,621 A | * | 6/2000 | Kishi et al. ................. 359/296 |
| 6,222,513 B1 | * | 4/2001 | Howard et al. ............... 345/84 |
| 6,373,461 B1 | * | 4/2002 | Hasegawa et al. .......... 345/107 |
| 6,525,865 B2 | | 2/2003 | Katase ....................... 359/296 |

* cited by examiner

*Primary Examiner*—Richard Hjerpe
*Assistant Examiner*—M. Fatahiyar
(74) *Attorney, Agent, or Firm*—Fitzpatrick, Cella, Harper & Scinto

(57) ABSTRACT

A pliable electrophoretic display device having a deformation-resistant memory characteristic is provided by covering a plurality of partitioning walls defining display sections containing a dispersion liquid with electrophoretic particle dispersed therein with an expandable ceiling sheet. Such a ceiling sheet is formed by applying a hardenable precursor liquid, which is immiscible with the dispersion liquid, over the partitioning walls containing the dispersion liquid and hardening the precursor liquid in situ by exposure to light, heat or by drying.

4 Claims, 4 Drawing Sheets

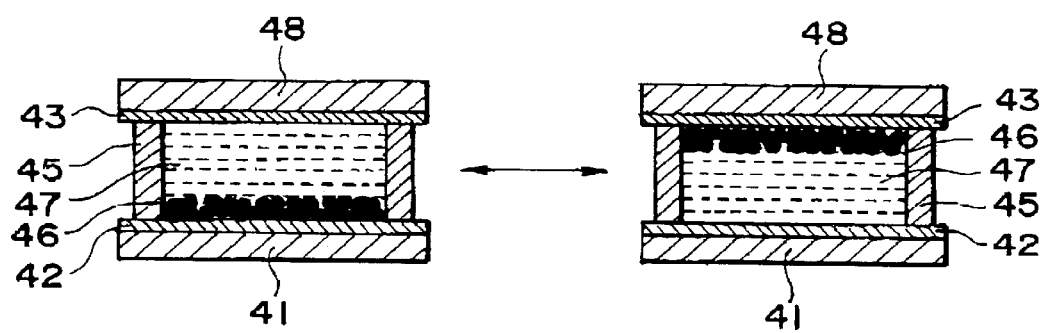
F I G. 4A     F I G. 4B

ELECTROPHORETIC DISPLAY DEVICE AND PROCESS FOR PRODUCTION THEREOF

FIELD OF THE INVENTION AND RELATED ART

The present invention relates to an electrophoretic display device and a process for production thereof.

Along with development of data processing apparatus and devices in recent years, there is an increasing demand for so-called "paper-like display" which is rewritable electronic paper satisfying the convenience of paper medium and electronic medium function for a portable personal computer. A display device used for such a paper-like display should require a small power consumption, be thin and have a flexibility like paper durable against flexure. One sheet or plural sheets of such display devices are used as a paper-like display.

Display devices in compliance with such a demand have been a subject of extensive research and development. Among these, a liquid crystal display device wherein an alignment of liquid crystal molecules is electrically controlled to change optical characteristics has been extensively developed and commercialized as a display device satisfying the demand described above. However, such liquid crystal display devices are still accompanied with problems of visual load on human eyes, such as difficulty of recognizing characters on display depending on a viewing angle or due to reflection light, and flickering and low luminance of light source. Further, because of necessity of alignment control of liquid crystal molecules and accurate control of liquid crystal cell gap, it is difficult to also satisfy a flexibility of the device.

As a type of reflection display device capable of realizing a flexibility, there has been known an electrophoretic display device wherein colored charged particles are moved within an insulating liquid to effect a display (e.g., as disclosed in U.S. Pat. No. 3,668,106). FIGS. 4A and 4B are schematic sectional views for illustrating an organization and an operating principle of a representative one of such an electrophoretic display device.

Referring to FIGS. 4A and 4B, an electrophoretic display device includes an electrophoretic dispersion liquid comprising an insulating liquid (colored dispersion medium) 47 and colored charged particles (electrophoretic particles) 46 dispersed therein, and a pair of oppositely disposed pair of electrodes 42 and 43 sandwiching the electrophoretic dispersion liquid. By applying a voltage across the electrophoretic display device via the electrodes 42 and 43, the electrophoretic particles 46 are electrophoretically moved to and fixed on either one of the electrodes 42 and 43 which are biased to mutually opposite polarities to effect a display. The display is effected based on the color of the electrophoretic particles 46 and the dyed color of the colored dispersion medium 47. More specifically, in a state shown in FIG. 4A wherein the electrophoretic particles 46 are attached to a first electrode 42 closer to a viewer, the color of the particles 46 is displayed. On the other hand, in a state shown in FIG. 4B wherein the particles are moved and attached to a second electrode 43 more remote from the viewer, the color of the dispersion medium 47 is displayed.

The display device can be formed in a thin shape In principle and formed in a device retaining some degree of flexibility by using flexible materials for the substrates and other associated members including electrodes.

Further, a display picture retention characteristic (or a display memory characteristic) is provided by making the circuit open immediately after the voltage application to hold some charge at the electrodes exerting a Coulomb force for attracting or adsorbing the colored electrophoretic particles.

By suppressing the reduction in charges held by the electrodes, e.g., by disposing an insulating layer of an appropriately selected material, the electrophoretic particles can be retained on the electrodes for a relatively long period, so that it is possible to continually retain a display memory characteristic for long hours without supplying any external power.

An electrophoretic display deice operates at a relatively low current compared with other types of display devices, such as a liquid crystal device, in principle, and can further reduce the average power consumption in a case where a frequent rewriting of display is not required.

However, a conventional electrophoretic display device is accompanied with the following problems.

A first problem is encountered at the time of injecting the electrophoretic dispersion liquid between the substrates in the process for producing the electrophoretic display device. In an example of the production process, two substrates for constituting the electrophoretic device is applied to each other while leaving a port for injecting the electrophoretic dispersion liquid. Thereafter, the electrophoretic dispersion liquid is injected through the injection port, but the smooth injection thereof is obstructed by the presence of a spacer and partitioning walls for keeping the spacing between the substrates at a constant. Further, in the case of injecting the electrophoretic dispersion liquid from an edge of the device toward the edge on the opposite side, the dispersion medium can be easily transferred but the electrophoretic particles are liable to be caught at the spacer and partitioning walls, so that the electrophoretic particle concentration is liable to be high near the injection port and lowered at points leaving away from the injection port, thus adversely affecting the display uniformity.

In another example of the production process, a lower substrate is first provided with spacer and partitioning walls, an electrophoretic dispersion liquid is uniformly distributed thereover, and thereafter an upper substrate is bonded to the lower substrate to seal the periphery of the structure. According to this process, a uniform concentration of electrophoretic particles over the planar extension of the device can be realized, but a problem of entrainment of air bubbles is liable to occur at the time of bonding the upper substrate.

A second problem is encountered as a difficulty of realizing a device showing paper-like flexibility. This is because an electrophoretic. display device is composed of two substrates so that it is difficult to absorb a difference between an inner circumference and an outer circumference caused when the device is flexurally deformed even if the two substrates are composed of flexible materials. Thus, the flexured device is liable to result in a stiff touch.

A third problem is liable to be encountered when a flexible device is flexurally deformed. Thus, at the time of deformation, the insulating liquid therein is flowed to push the electrophoretic particles adsorbed by electrostatic interaction with the electrode retention charge, so that the display is liable to be deformed to remove the display memory characteristic.

SUMMARY OF THE INVENTION

A generic object of the present invention is to provide an electrophoretic display device and a process for production thereof having solved the above-mentioned problems of the prior art.

A more specific object of the present invention is to provide an electrophoretic display device having a flexibility susceptible of easily following flexural deformation.

Another object of the present invention is to provide an electrophoretic display device free from loss of display memory characteristic even when subjected to deformation.

A further object of the present invention is to provide a process for producing an electrophoretic display device allowing easy injection and sealing of an electrophoretic dispersion liquid.

According to the present invention, there is provided an electrophoretic display device for effecting a display by moving electrophoretic particles, comprising: a flexible support sheet, a plurality of partitioning walls formed on the support sheet, a ceiling sheet disposed over the partitioning walls and opposite to the support sheet so as to form a plurality of cells defined by the support sheet, the ceiling sheet and the partitioning walls, and a electrophoretic dispersion liquid filling the cells and comprising an insulating liquid and electrophoretic particles dispersed in the insulating liquid, wherein the ceiling sheet is flexible and also capable of expansion and contraction upon application of a planar stress.

According to another aspect of the present invention, there is provided a process for producing an electrophoretic display device for effecting a display by moving electrophoretic particles dispersed in an insulating liquid while changing a direction of electric field acting on the electrophoretic particles, comprising the steps of:

disposing a plurality of partitioning walls on a flexible support sheet to form a plurality of sections defined by the support sheet and the partitioning walls, injecting an electrophoretic dispersion liquid comprising an insulating liquid and electrophoretic particles dispersed therein into the sections on the support sheet, applying a hardenable liquid immiscible with the insulating liquid over the partitioning walls and the electrophoretic dispersion liquid therein, and hardening the hardenable liquid to form a ceiling sheet thereby defining a plurality cells within which the electrophoretic dispersion liquid is sealed up.

Thus, by using a ceiling sheet capable of expansion and contraction upon application of a planar stress, i.e., a stress acting in a plane extension thereof, the electrophoretic display device of the present invention becomes easily pliable in response to flexural deformation. Further, a flexural deformations stress acting on the device can be absorbed by deformation of the ceiling sheet, so that the flow of the electrophoretic display device in the device is suppressed to provide the electrophoretic display device with a better display memory characteristic.

Further, according to the process of the present invention, it is possible to produce an electrophoretic display device, while easily achieving uniform distribution and sealing into respective display sections of the electrophoretic dispersion liquid.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 4A and 4B are schematic sectional views for illustrating an organization and an operation principle of a known electrophoretic display device.

DESCRIPTION OF THE PREFERRED EMBODIMENTS (Organization)

Figure 1:
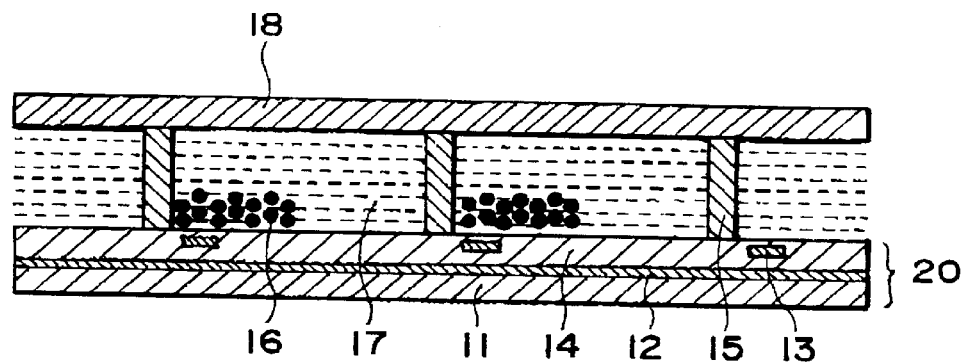
FIGS. 1 and 2 are schematic sectional views each illustrating an organization of an embodiment of the electrophoretic display device according to the invention.

FIG. 1 is a schematic sectional view of an embodiment of the electrophoretic display device according to the present invention for illustrating basic organization thereof.

Referring to FIG. 1, on a flexible substrate 11, a plurality of stripe-shaped first electrodes (films) 12 are formed in parallel with each other and with a prescribed constant spacing therebetween while only one stripe first electrode 12 is shown. Further, above the stripe first electrodes 12, a plurality of stripe-shaped second electrodes 13 are formed in parallel with each other and with a prescribed constant spacing therebetween and so as to extend perpendicularly to the stripe first electrodes 12. An insulating layer 14 is disposed between the first electrodes 12 and the second electrodes 13 and surrounding the second electrodes 13, so as to insulate the electrodes from each other and prevent the electrodes from directly contacting an electrophoretic dispersion liquid. Herein, a laminate including the flexible substrate 11, the first electrode 12, the second electrodes 13 and the insulating layer 14 is called a flexible support sheet 20.

On the insulating layer 14 of the flexible support sheet 20, a plurality of flexible partitioning walls 15 (each in a shape of generally rectangular frame of which only sides are shown) are disposed with their parallel sides extending parallel to each other with a prescribed spacing therebetween and parallel to the stripe second electrodes 13 (and with their unshown parallel sides extending parallel to the stripe first electrodes 12). The tops of the partitioning walls 15 are entirely covered with a ceiling sheet 18 which is flexible and also capable of expansion and contraction upon receiving a planar stress. The properties of the ceiling sheet 18 are represented by expandability, and the ceiling sheet (18) is hereinafter sometimes called an expandable ceiling sheet (18).

Each of cells defined by the flexible support sheet 20, the flexible partitioning walls 15 and the expandable ceiling sheet 18, is a display section or pixel and filled with an electrophoretic dispersion liquid comprising an insulating liquid (dispersion medium) 17 and electrophoretic particles 16 dispersed therein.

Figure 2:
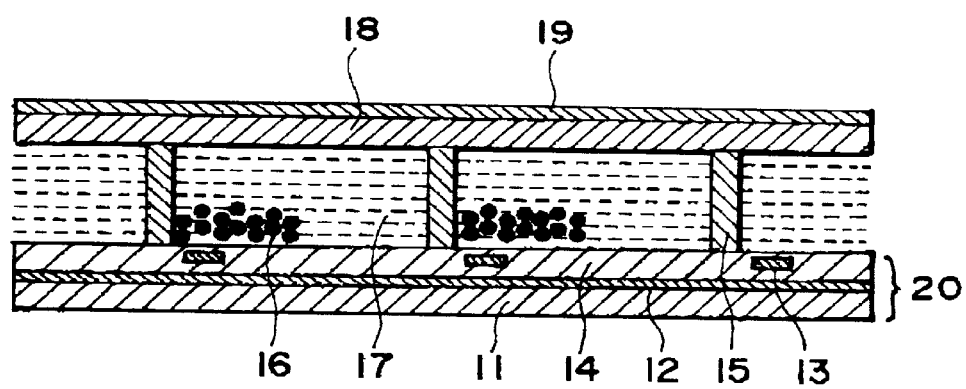

As shown in an embodiment of FIG. 2, the expandable ceiling sheet 18 can be further coated with a protective film 19. The ceiling sheet 18 may for example comprise a film of a polymeric material as described in further detailed below, through which a low-molecular weight substance, such as an insulating liquid 17 or an external gas, can penetrate. The provision of such a protective film 19 is sometimes effective for preventing the penetration of such a low-molecular weight substance to prevent the evaporation loss of the dispersion liquid component and improve the gas-barrier characteristic, and for mechanically reinforcing the ceiling sheet 18.

(Materials)

Next, some examples of materials suitable for constituting the respective members of the electrophoretic display device according to the present invention, will be described.

1. Flexible Substrate 11

The flexible substrate 11 may comprise a resinous material suitable for providing a flexible and transparent film. Examples thereof may include: polyesters, polyethylene, polypropylene, polyethersulfone, polycarbonate, polymethyl methacrylate and other acrylic resins. The flexible substrate may preferably have a thickness of 50–200 µm.

2. Insulating Layer 14

The insulating layer 14 may comprise a resinous material similar to those enumerated above as materials for constituting the flexible substrate 11. It is also suitable to use a thermosetting or photocurable resin, such as a polyimide, as by application of a precursor solution for film formation. The insulating layer 14 may preferably have a thickness of 0.5–2 µm.

3. Flexible Partitioning Wall 15

The flexible partitioning walls 15 may comprise a resinous material similar to those used for constituting the flexible substrate 111 The flexible partitioning walls 15 can be molded integrally with the flexible substrate 11 or can be formed later on the flexible substrate 11 by using a photosensitive material for patterning It is preferred to form the partitioning walls in a state free from bonding with the ceiling sheet 18 formed later thereon so as to allow a slide of the ceiling sheet 18 at the time of flexural deformation of the resultant display device. This allows a easier flexible deformation of the display device as a whole. For this purpose, it is preferred to use materials for the partitioning walls 15 and the ceiling sheet 18 which show little affinity or compatibility with each other. The partitioning walls 15 may preferably be formed in a width of 5–15 µm and in a height of 10–50 µm so as to provide an aspect (height/width) ratio of ca. 2–3.

4. Expandable Ceiling Sheet 18

The expandable ceiling sheet 18 may preferably comprise a film of resinous material which is not only flexible like the flexible substrate 11 but also capable of expansion and contraction following the flexural deformation or warping of the flexible substrate 11 exerting a planar expansion or contraction stress onto the ceiling sheet 18. A typical of such material is rubber or elastomer, examples of which may include: homopolymers of isoprene, butadiene and silicones, and elastomeric copolymers, such as ethylene propylene-diene copolymer, styrene(-acrylonitrile)-isoprene or butadiene copolymer. It is particularly preferred to use a block copolymer for providing good mechanical strength and expandability in combination. In addition to a typical rubber or elastomer as mentioned above it is also possible to use a film of a resinous material which exhibits a Young's modulus which is at most 100%, preferably 0.001%–10% of that of the flexible substrate. Example of such a film material may include polyvinylidene chloride, copolymer nylon, and ethylene-propylene copolymers.

Such an elastomeric or elastic resin material may be dissolved in an appropriate solvent to form a solution, which may suitably be applied over the partitioning walls 15 in a state of containing the electrophoretic dispersion liquid therein, e.g., by spraying and then subjecting to drying for removal of the solvent to form a ceiling sheet 18 thereover.

Alternatively, it is also possible to form a hardeneable liquid by mixing an elastomeric or elastic resin material or a precursor thereof with a polymerizable monomer and an appropriate thermal or photoinitiator, and apply the hardenable liquid, e.g., by spraying over the partitioning walls 15, followed by hardening due to heating or photoirradiation to form a ceiling sheet 18.

The ceiling sheet may preferably be formed in a thickness of 10–500 µm.

5. Protective Film 19

As mentioned above, the protective film 19 need not be used if the expandable ceiling sheet 18 has a sufficient gas-barrier characteristic and mechanical strength. However, the provision of such a protective film 19 can increase the latitude of material selection for the expandable ceiling sheet 18. The protective film 19 is required to exhibit n expandability following the expansion and contraction of the ceiling sheet 18, but can also comprise a resinous material similar to those constituting the flexible substrate since the thickness thereof is not so large. More specifically, the protective film 19 may have a thickness of 1–10 µm, preferably 1–3 µm.

6. Electrophoretic Dispersion Liquid 6-1. Insulating Liquid (Dispersion Medium)

For the insulating liquid (dispersion medium) 17, it is possible to use paraffinic hydrocarbon (normal paraffin or isoparaffin), halogenated hydrocarbon, silicone oil, etc. Among these, isoparaffin may particularly suitably be used because of good dispersibility of dielectric particles, inexpensiveness and low toxicity to human body. Representative examples of commercially available isoparaffin products may include "SHELLSOL 70, 71 and 72" (available from shell Japan K.K.), "ISOPAR G, H, L and M" (available from Exxon Chemical K.K.), and "IP-SOLVENT 1620, 2028 and 2835" (available from Idemitsu Sekiyu Kagaku K.K.).

6-2. Electrophoretic Particles

Electrophoretic particles 16 may comprise a material selected from wide scopes of inorganic and organic dielectric materials.

Examples of the inorganic materials may include: glass, alumina, zirconia, titania and silicon nitride.

The organic materials may include various examples and resins. Examples of the resins may include: polystyrene, polyacrylates, polymethacrylates, polyacrylonitrile, rubbery resins such as isoprene rubber and butadiene rubber, polyesters, polyurethane. polyamides, epoxy resins, rosin, polycarbonates, phenolic resin, chlorinated paraffins, polyethylene, polypropylene, silicone resins, polytetrafluoroethylene, derivatives and copolymers of these, and mixtures of these.

6-3. Colorant for the Electrophoretic Particles

Resinous electrophoretic particles, when used, may be colored, as desired, with carbon black, or other various pigments or dyes.

Electrophoretic particles, optionally colored, may have a diameter in a range of 0.1 µm to several tens of µm. The particles may desirably be spherical.

6-4. Charge Control Agent

It is sometimes desired to use an appropriate amount of charge control agent in order to provide a specific charge to the surface of the electrophoretic particles 16 and improve the phoretic property and dispersion stability of the particles.

The charge control agent may be a positive charge control agent or a negative charge control agent. Examples of the positive charge control agent may include: sodium dioctylsulfosuccinate (available from American Cyanamid Co.), and metallic soaps. Examples of the negative charge control agent may include: soybean lecithin, polyimide alkenylsuccinate (e.g., "OLOA-1200" and "OLOA-4375H", available from Oronite Japan K.K.), and petroleum sulfonates inclusive of basic calcium petronate and basic barium petronate (available from Witco Chemical Corp.).

The above-mentioned charge control agent may suitably be used by disclosing it in the insulating liquid. If electrophoretic particles are dispersed in the insulating liquid, the charge control agent is adsorbed onto the surface of the electrophoretic particles to develop a specific charge in the liquid. The charge control agent may be contained in ca. 0.01 to ca. 10 wt. % of the electrophoretic dispersion liquid composition, and an optimum amount thereof can vary depending on a particular charge control agent thereof.

In some cases, a charge control agent can be incorporated in the electrophoretic particles.

(Viewing Direction)

The electrophoretic display device of the present invention can be viewed either from the flexible substrate 11 side or the expandable ceiling sheet 18 side. In the case where the substrate 11 side is used to provide a display surface, the substrate 11 is made transparent and the ceiling sheet 18 may be formed of a material in mixture with reflective material powder or may be backed with a reflection layer. In the case where the ceiling sheet 18 side is used to provide a display surface, the ceiling sheet 18 (and the protective film 19, when used) are made transparent, and the substrate 11 may be formed of a material in mixture with reflective material powder or may be backed with a reflection layer. It is possible to use a luminescence layer instead of the reflection layer As the reflective material powder, it is possible to use powder of a white pigment, such as titanium oxide, tin oxide or aluminum oxide, or metal powder.

(Production Process)

FIGS. 3A–3G are schematic sectional views for illustrating a series of steps involved in an embodiment of the process for producing an electrophoretic display device according to the present invention.

Figure 3A:
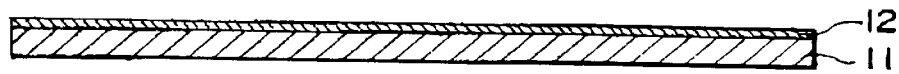
FIGS. 3A–3G are schematic sectional views illustrating a series of steps involved in an embodiment of the process for producing an electrophoretic display device according to the invention.

Referring to these figures, a plurality of relatively wide stripe first electrodes 12 (only one being shown) are formed parallel to each other and at a prescribed pitch on a flexible substrate 11 (FIG. 3A).

Figure 3B:
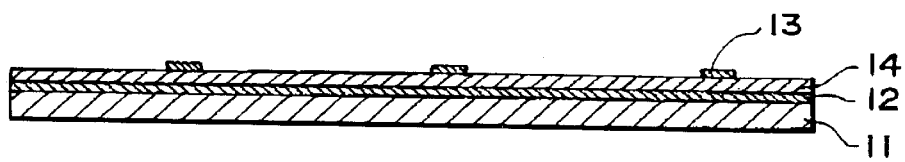

The first electrodes 12 are coated with an insulating layer 14, and a plurality of narrower second electrodes 13 are formed thereon parallel to each other, and with a prescribed spacing therebetween so as to extend perpendicularly to the stripe first electrodes 12 (FIG. 3B).

Figure 3C:
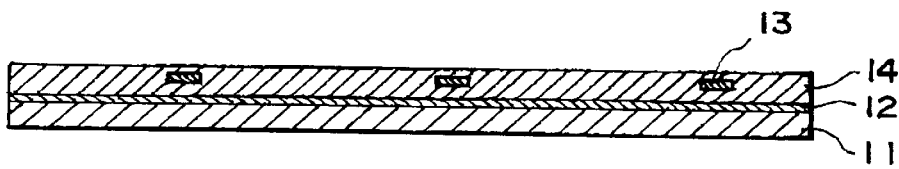

An additional portion of insulating layer 14 is formed over the second electrodes 13 (FIG. 3C).

Figure 3D:
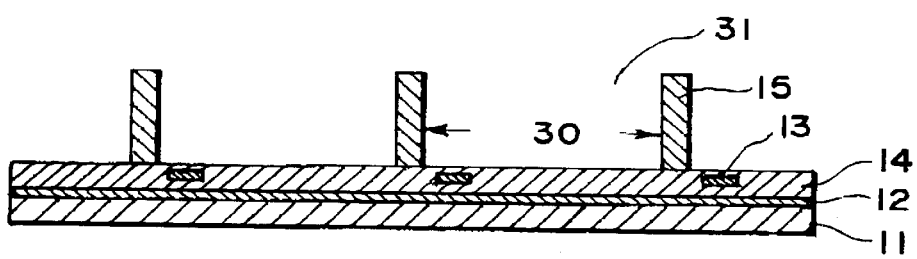

On the insulating layer 14, a plurality of rectangular (or square) frame-shaped flexible partitioning walls 15 are formed so as to define a corresponding number of display sections (pixels) 30 with an opening 31. Side walls of the partitioning walls 15 are arranged parallel to and at equal pitches with the first electrodes 12 and the second electrodes 13, respectively, so that each section 30 includes one stripe first electrode 12 and one stripe second electrodes 13 intersecting at right angles with each other (FIG. 3D).

Figure 3E:
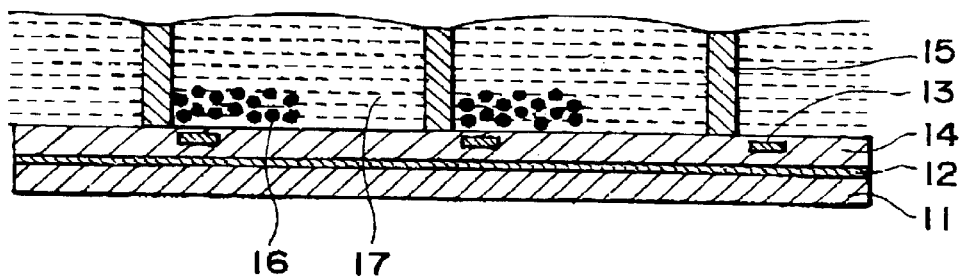

Into each section 30 defined by a partitioning wall 15 and bottomed with the insulating layer 14, an electrophoretic dispersion liquid comprising a mixture of an insulating liquid 17, electrophoretic particles 16 and an optional charge control agent, is injected The electrophoretic dispersion liquid may preferably be injected in an amount sufficient to slightly exceed the height of the flexible partitioning walls 15 and be convex by a surface tension of the insulating layer 17. As each section 30 at this stage is provided with a full opening 31, the uniform distribution of and injection into each section 30 of the electrophoretic dispersion liquid can be easily performed (FIG. 3E).

Figure 3F:
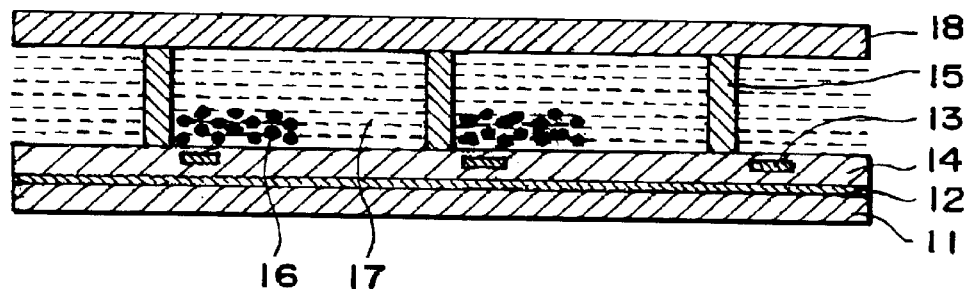

Over the plurality of sections 30 defined by the partitioning walls 15 and filled with the electrophoretic dispersion liquid, a hardenable liquid comprising a precursor of the expandable ceiling sheet is applied, preferably by spraying. More specifically, the spraying of the dispersion liquid may for example be effected by using a micro-sprayer (e.g., one available from Nordson Corp.) or liquid droplet ejection techniques capable of accurate control of amount and destination of the ejected liquid droplet, such as the so-called ink jet printing technique (e.g., one using a bubble jet printer head available from Canon K.K.). By hardening the hardenable liquid, an expandable ceiling sheet 18 is formed over the suctions 30. The hardening of the hardenable liquid may be effected by irradiation with heat or actinic light of the hardenable liquid or by evaporation of a solvent constituting the hardenable liquid together with the ceiling sheet precursor (FIG. 3F).

Figure 3G:
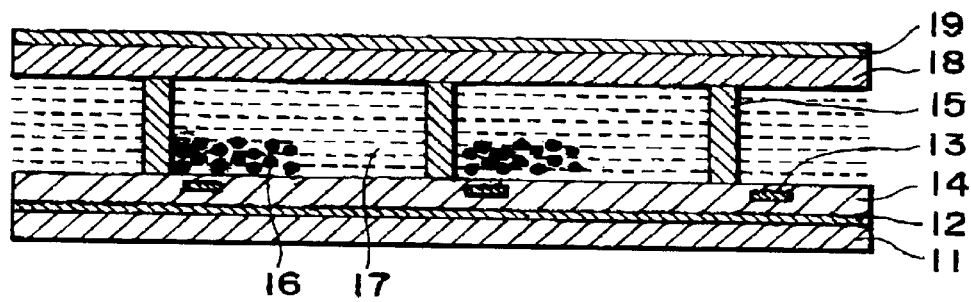

Further, the ceiling sheet 18 is optionally coated with a protective film 19 (FIG. 3G).

(Flexible and Memory Characteristic)

The electrophoretic display device thus formed has a film-like appearance and is easily pliable when subjected to flexural deformation. This is presumably because one surface is composed of a flexible substrate and the other surface is composed of an expandable ceiling sheet so that an inner-outer circumferential difference caused by flexural deformation is compensated or absorbed by an expansion and/or contraction of the expandable ceiling sheet.

As for the display memory characteristic, the flexural deformation stress acting on the display device is absorbed by the deformation of the expandable ceiling sheet, so that the movement or flow of the insulating liquid and accompanying movement of the electrophoretic particle can be suppressed to better retain the display state given by the localized electrophoretic particles.

Hereinbelow, the present invention will be described more specifically based on Examples, wherein "part(s)" means "part(s) by weight ".

EXAMPLE 1

(1) Preparation of Electrophoretic Particles

In 50 parts of styrene, 1 part of azobisisobutyronitrile was dissolved and 20 parts of carbon black was mixed therewith to form a polymerizable composition. Separately, 1.5 parts of silica fine powder ("Aerosil #200", made by Nippon Aerosil K.K.) was dispersed in 450 parts of deionized water, and the above-prepared polymerizable composition was poured thereinto, followed by stirring at 5000 rpm by using a homogenizer to form an emulsion. Thereafter, the system was heated to 80° C. and stirred for ca. 1 hour to effect the polymerization. Then, the content was transferred to another vessel and further subjected to 6 hours of polymerization at 80° C. under propeller stirring at 200 rpm. Thereafter, the system was cooled, and the polymerizate particles were subjected to repetition of recovery by filtration and washing with water, followed by drying to obtain black electrophoretic particles having an average particle size (diameter) of 1.5 μm.

(2) Preparation of Electrophoretic Dispersion Liquid

Into 100 parts of a paraffinic solvent ("ISOPAR G", available from Exxon Kagaku K.K.), 5 parts of the above-prepared electrophoretic particles and 0.1 part of cobalt naphthanate were dispersed and stirred for ca. 1 hour to obtain an electrophoretic dispersion liquid.

In the dispersion liquid, the electrophoretic particles exhibited a surface zeta potential of +100 mV on an average as measured by using a zeta potential meter (available from Ohtsuka Denshi K.K.).

(3) Preparation of Electrophoretic Display Device

An ITO-coated 100 μm-thick polycarbonate film substrate ("ELECLEAR HA-B200" made by Teijin K.K., exhibiting a surface resistivity of 200 ohm) was subjected to patterning of the ITO film to form ca. 100 μm-wide stripe first electrodes, and then coated with a 2 μm-thick insulating layer of acrylic resin "OPTMER". made by JSR K.K.). Thereafter, 10 μm-wide stripe-shaped aluminum electrodes (second electrodes were disposed on the insulating layer at a pitch of 100 μm so as to extend perpendicularly to the first electrodes, and further coated with a 2 μm-thick insulating layer of acrylic resin ("OPTMER").

On the insulating layer, a 30 μm-thick layer of ultraviolet (UV)-curable acrylic resin ("THB", made by JSR K.K.) was applied and exposed through a photomask in a pattern of ca. 9 μm-wide frame-shaped partitioning walls surrounding a section area of ca. 100 μm×100 μm, followed by development for dissolution removal of the unexposed part to leave 30 μm-high partitioning walls. Into open sections (spaces) defined by the partitioning walls and bottomed With the insulating layer, the above-prepared electrophoretic dispersion liquid was distributed.

Then, over the dispersion liquid distributed to the sections, a mixture liquid of 70 parts of a coating liquid principally comprising cyclized isoprene rubber ("OBR", made by Tokyo Ohka Kogyo K.K.) and 30 parts of aluminum oxide fine particles, was uniformly applied by spraying through a microsprayer (made by Nordson Corp.), and then dried at 120° C. to leave a ca. 100 μm-thick film functioning as an expandable ceiling sheet and also as a reflection layer and also uniformly confining the electrophoretic dispersion liquid at respective sections, thereby completing an electrophoretic display device having a sectional structure as illustrated in FIG. 1. The distributed concentration of the electrophoretic particles over the extension of the device and therefore in the respective display sections was uniform.

Then, the operation of the thus-prepared electrophoretic display device was tested as follows The first electrodes 12 were grounded, and the second electrodes 13 were set to a potential of +100 volts, whereby the electrophoretic particles 16 left the second electrodes 13 and were spread over the first electrodes to provide a black display state at the respective display sections when observed from the polycarbonate film substrate 11 side.

Then, the second electrodes 13 were set to a potential of −100 volts, whereby the electrophoretic particles 16 were gathered on the narrow second electrodes 13 to provide a white display state by reflection light from the ceiling sheet 18 due to the aluminum oxide dispersed therein when viewed from the polycarbonate film substrate 11 side.

Then, the potential of the second electrodes 13 was alternated between +100 volts and −100 volts at a frequency of 1 Hz, whereby the respective display sections exhibited black and white display states alternately in synchronism with the potential alternation.

Then, the device was made free from voltage application and subjected to flexural deformation, whereby the device exhibited an easy pliability without causing a disorder of the display states, thus showing a display memory characteristic

EXAMPLE 2

The process of Example 1 was repeated up to the distributive injection of the electrophoretic dispersion liquid except for using a UV-curable resin comprising novolak resin ("PMER", made by Tokyo Ohka Kogyo K.K.).

Then, over the dispersion liquid distributed to the display sections, a mixture liquid comprising 60 parts of styrene-isoprene block polymer, 40 parts of maleic acid ester and 1 part of benzoyl ether, was uniformly applied by a microsprayer (made by Nordson Corp.), and then uniformly exposed to ultraviolet rays, followed by drying at 120° C., to form a 100 -m-thick transparent ceiling sheet.

The electrophoretic dispersion liquid contained in the resultant electrophoretic display device exhibited a uniformly distributed concentration of electrophoretic particles over the extension of the device.

It was confirmed that the device operated in a similar manner as in Example 1.

EXAMPLE 3

The process of Example 2 was repeated up to the distributive injection of the electrophoretic dispersion liquid except for forming the insulating layer over the aluminum electrodes (second electrodes 13) with a 100:30 (by weight) mixture of alumina particles and acrylic resin ("OPTMER"), thus providing a 2 μm-thick insulating and reflecting layer.

Then, over the dispersion liquid distributed to the display sections, a mixture liquid comprising 65 parts of terminal hydrogenated polybutadiene, 40 parts of fumaric acid ester and 1 part of benzyl ketal, was uniformly applied by a microsprayer (made by Nordson Corp.) and then uniformly exposed to ultraviolet rays to form a 100 μm-thick transparent ceiling sheet, thereby completing an electrophoretic display device having a sectional structure similarly as shown in FIG. 1.

The electrophoretic dispersion liquid contained in the resultant electrophoretic display device exhibited a uniformly distributed concentration of electrophoretic particles over the extension of the device.

Then, the operation of the thus-prepared electrophoretic display device was tested as follows.

The first electrodes 12 were grounded, and the second electrodes 13 were set to a potential of +100 volts, whereby the electrophoretic particles 16 left the second electrodes 13 and were spread over the first electrodes 12 to provide a black display state at the respective display sections when observed from the ceiling sheet 18 side.

Then, the second electrodes 13 were set to a potential of −100 volts, whereby the electrophoretic particles 16 were gathered on the narrow second electrodes 13 to provide a white display state by reflection light from the insulating layer 14 due to the aluminum oxide dispersed therein when viewed from the ceiling sheet 18 side.

Then, the potential of the second electrodes 13 was alternated between +100 volts and −100 volts at a frequency of 1 Hz, whereby the respective display sections exhibited black and white display states alternately in synchronism with the potential alternation.

Then, the device was made free from voltage application and subjected to flexural deformation, whereby the device exhibited an easy pliability without causing a disorder of the display states, thus showing a display memory characteristic.

As described above, according to the process of the present invention, it has become possible to produce an electrophoretic display device while easily achieving uniform distribution and sealing into respective display sections of the electrophoretic dispersion liquid. Further, the electrophoretic display device thus obtained according to the present invention is easily pliable in response to flexural deformation and retains a display memory characteristic in response to such a deformation, thus suitably providing a paper-like display.

What is claimed is:

1. An electrophoretic display device for effecting a display by moving electrophoretic particles, comprising:

a flexible support sheet;

a plurality of partitioning walls formed on the support sheet;

a ceiling sheet disposed over the partitioning walls and opposite to the support sheet so as to form a plurality of cells defined by the support sheet, the ceiling sheet and the partitioning walls; and an electrophoretic dispersion liquid filling the cells and comprising an insulating liquid and electrophoretic particles dispersed in the insulating liquid, wherein the ceiling sheet is flexible and also capable of expansion and contraction following flexural deformation or warping of the flexible support sheet.

2. A process for producing an electrophoretic display device for effecting a display by moving electrophoretic particles dispersed in an insulating liquid while changing a direction of electric field acting on the electrophoretic particles, comprising the steps of:

disposing a plurality of partitioning walls on a flexible support sheet to form a plurality of sections defined by the support sheet and the partitioning walls, injecting an electrophoretic dispersion liquid comprising an insulating liquid and electrophoretic particles dispersed therein into the sections on the support sheet, applying a hardenable liquid immiscible with the insulating liquid over the partitioning walls and the electrophoretic dispersion liquid therein, and hardening the hardenable liquid to form a ceiling sheet thereby defining a plurality cells within which the electrophoretic dispersion liquid is sealed, wherein the ceiling sheet is flexible and also capable of expansion and contraction following flexural deformation or warping of the flexible support sheet.

3. A process according to claim 2, wherein the hardenable liquid is applied over the partitioning walls and the electrophoretic dispersion liquid therein by spraying.

4. A process according to claim 2, wherein the hardenable liquid is hardened by exposure to light, heat or driving.

* * * * *

UNITED STATES PATENT AND TRADEMARK OFFICE
CERTIFICATE OF CORRECTION

PATENT NO.    : 6,750,844 B2
DATED         : June 15, 2004
INVENTOR(S)   : Masahiro Nakanishi It is certified that error appears in the above-identified patent and that said Letters Patent is hereby corrected as shown below:

Column 2,
Line 13, "deice" should read -- device --.

Column 3,
Line 41, "cells" should read -- of cells --.

Column 4,
Line 55, "detailed" should read -- detail --.

Column 5,
Line 18, "111" should read -- 11. --.

Column 6,
Line 7, "n" should read -- an --.

Column 8.
Line 7, "suctions" should read -- sections --.

Column 12,
Line 9, "cells" should read -- of cells --.

Signed and Sealed this

Fourteenth Day of December, 2004

JON W. DUDAS
*Director of the United States Patent and Trademark Office*